E. J. HOUSE.
SAVINGS AND INSURANCE ACCOUNT BOOK.
APPLICATION FILED MAY 11, 1920.

1,423,114.

Patented July 18, 1922.

| THE LIBERTY SAVINGS & LOAN COMPANY LIFE INSURANCE DEPARTMENT SUBJECT TO RULES AND REGULATIONS | | | | | No. 103 A    Age. 35 Amount of Insurance $10,000 In Name of and Account with John Doe Cleveland, O. | | | | |
|---|---|---|---|---|---|---|---|---|---|
| Date | Deposited | Paid for Insurance | Amount of Insurance | Cash Savings | Interest | Total on Deposit | Withdrawn | Total to Beneficiary |
| 1920 Jan. 2 | 199 60 | 199 60 | 10000 00 | | | | | 10000 00 |
| 1921 Jan. 2 | 199 60 | 181 00 | 10000 00 | 18 60 | 93 | 19 53 | | 10019 53 |
| 1922 Jan. 2 | 199 60 | 167 00 | 10000 00 | 32 60 | 2 60 | 54 73 | | 10054 73 |
| 1923 Jan. 2 | 199 60 | 156 00 | 10000 00 | 43 60 | 4 92 | 103 25 | | 10103 25 |

*Inventor*
Everett J. House
By Louis P. Griswold,
Atty.

UNITED STATES PATENT OFFICE.

EVERETT J. HOUSE, OF CLEVELAND, OHIO.

SAVINGS AND INSURANCE ACCOUNT BOOK.

1,423,114.  Specification of Letters Patent.  Patented July 18, 1922.

Application filed May 11, 1920. Serial No. 380,580.

*To all whom it may concern:*

Be it known that I, EVERETT J. HOUSE, citizen of the United States, residing at Cleveland, in the county of Cuyahoga and State of Ohio, have invented certain new and useful Improvements in Savings and Insurance Account Books, of which the following is a specification.

This invention relates to improvements in account-books of savings associations operating in conjunction or associated with an insurance department in which the depositor's life is insured for a given amount, the premium for said insurance being deposited with the savings association to the credit of the insurance association. Beginning with the second year and continuing each year thereafter, the full premium again being deposited with the savings association, the life association instructs the savings association to credit to the savings account of the insured the amount that it has saved and earned. It is estimated that the amount of the credit will gradually increase annually and this together with the interest accumulation earned through the savings association will, in a limited number of years, form a fund from which will pay the life insurance premium for the rest of the insured's life.

The object of the present invention is to provide a deposit-book suitably arranged for keeping the account of the depositor or the insured which shall indicate clearly the itemized transactions.

To the accomplishment of the aforesaid object, the invention consists in certain columns, spaces, and lines upon the account-book pages peculiarly arranged and designated to carry out the aforesaid object, as hereinafter described and especially distinguished in the claim, reference being had to the accompanying drawing which is made part of the specification.

The system is preferably arranged to cover two opposite pages of a blank-book, as shown in the drawing. At the top of the left hand page is the name of the association and the department, and at the top of the right hand page are lines on which may be noted the number of the account, the age of the insured, the amount of insurance, and the name and address of the insured. These entries are arbitrary or not restrictive, but are used for the purpose of illustration and may be changed without departing from the invention. Below these entries are vertical columns arranged as follows: On the left hand page is a date column, next a deposit column, then a column for entering the amount paid on insurance, then a column for the amount of insurance, followed by a column for cash-savings. Continuing on the right hand page are columns for indicating interest, total on deposit, withdrawals, and total to beneficiary.

An example of entries is illustrated in the drawing. These entries are based on estimates made and of course are arbitrary. The present example shows that the depositor on Jan. 2, 1920, deposited $199.60, which was the premium for one year on $10,000.00 life insurance. On Jan. 2, 1921, the same amount was deposited. Of this amount, $181.00 was applied on insurance, $18.60 is entered as cash savings, and .93 as accrued interest, making a total on deposit of $19.53, and adding this amount to the $10,000.00 makes the total to beneficiary $10,019.53, there being no withdrawals. On Jan. 2, 1922, the same amount, $199.60, is deposited, $167.00 is paid on insurance, $32.60 is cash savings. The accrued interest is $2.60, which added to the $32.60 and $19.53, makes a total on deposit of $54.73, and, there being no withdrawals during the year, the total to beneficiary is $10,054.73.

It is obligatory on the part of the insured to deposit annually the full premium amount as indicated in the second column from the left, and the amount of insurance remains the same, as indicated in the fourth column. Each year after the first year, a portion of the full premium amount is credited to cash savings, as shown in column five, interest is recorded in column six, and the total on deposit is entered in column seven, the total to beneficiary increasing each year, as noted in the last column.

The novel arrangement of the record columns, provided with suitable headings, provides a simple account-book that is mutually beneficial and convenient to the depositor and the savings and insurance associations.

What I claim and desire to secure by Letters Patent is:

Means for facilitating the keeping of depositors' accounts with associated savings and insurance organizations, consisting of a pass book the pages of which have successively arranged, appropriately headed columns for entering the date of deposits, amount of deposit, amount paid for insurance, amount of insurance, cash-savings, interest, total on deposit, withdrawals, and total to beneficiary.

In testimony whereof I affix my signature.

EVERETT J. HOUSE.